(12) United States Patent
Hunt et al.

(10) Patent No.: US 8,833,200 B2
(45) Date of Patent: Sep. 16, 2014

(54) SUSPENSION ADJUSTMENT ACTUATOR APPARATUS

(71) Applicant: SRAM, LLC, Chicago, IL (US)

(72) Inventors: Matthew Hunt, Villa Park, IL (US);
Berndt Kretschmer, Schweinfurt (DE);
Kevin Wesling, Lombard, IL (US)

(73) Assignee: SRAM, LLC, Chicago, IL (US)

( * ) Notice: Subject to any disclaimer, the term of this patent is extended or adjusted under 35 U.S.C. 154(b) by 0 days.

(21) Appl. No.: 13/670,178

(22) Filed: Nov. 6, 2012

(65) Prior Publication Data

US 2013/0127145 A1    May 23, 2013

Related U.S. Application Data

(63) Continuation of application No. 10/707,019, filed on Nov. 14, 2003, now Pat. No. 8,490,995.

(51) Int. Cl.
*B62K 23/02*    (2006.01)
*B62K 25/00*    (2006.01)
*B62K 25/04*    (2006.01)

(52) U.S. Cl.
CPC ........... *B62K 25/00* (2013.01); *B62K 2025/048* (2013.01); *B62K 23/02* (2013.01)
USPC ........................................ 74/502.2; 280/276

(58) Field of Classification Search
USPC ........... 188/299.1, 300; 74/489, 500.5, 501.5, 74/501.6, 502.2, 527; 280/276, 284
See application file for complete search history.

(56) References Cited

U.S. PATENT DOCUMENTS

| | | | |
|---|---|---|---|
| 4,679,811 A | 7/1987 | Shuler |
| 5,275,264 A | 1/1994 | Isella |
| 5,320,375 A | 6/1994 | Reeves |
| 5,966,993 A | 10/1999 | Ekins |
| 6,155,132 A | 12/2000 | Yamane |
| 6,382,370 B1 | 5/2002 | Girvin |
| 6,767,024 B1 | 7/2004 | Kuo |

FOREIGN PATENT DOCUMENTS

| | | |
|---|---|---|
| DE | 20210280 | 8/2002 |
| EP | 0 541 891 | 5/1993 |
| EP | 0 814 015 | 12/1997 |
| JP | 06179386 | 6/1994 |
| WO | 9609203 | 3/1996 |

*Primary Examiner* — Troy Chambers
*Assistant Examiner* — Terence Boes
(74) *Attorney, Agent, or Firm* — Milan Milosevic; Lisa Serdynski; Steven Courtright

(57) ABSTRACT

An apparatus comprising a body, an actuator assembly and an actuator control assembly. The actuator assembly includes a lever arm in pivoting engagement with the body about a pivot axis spaced apart from an axis of a handlebar to which the body is attached. The lever arm is associated with a suspension adjust cable. The actuator control assembly includes a locking assembly and an adjustment assembly. The locking assembly is associated with each of the body and the actuator assembly. The locking assembly is capable of preventing pivoting of the actuator relative to the body in a first position corresponding to a first suspension setting. The adjustment assembly is associated with each of the body and the actuator assembly. The adjustment assembly is capable of preventing pivoting of the actuator relative to the body in a second position corresponding to a second suspension setting.

25 Claims, 3 Drawing Sheets

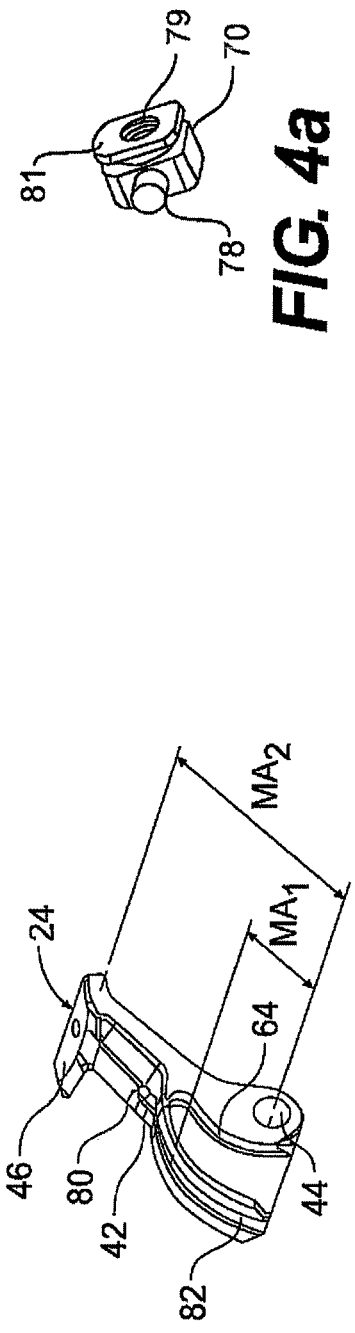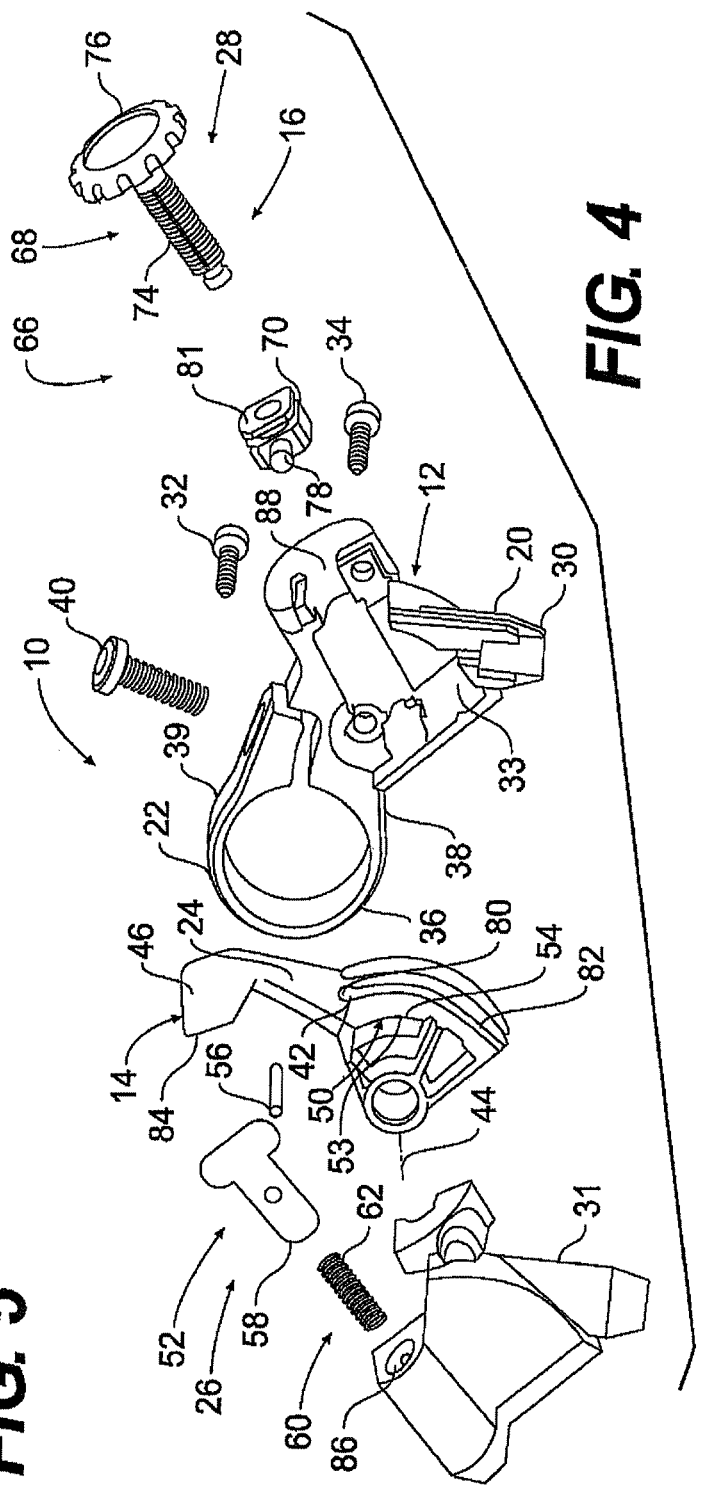

SUSPENSION ADJUSTMENT ACTUATOR APPARATUS

This is a continuation of U.S. Ser. No. 10/707,019, filed Nov. 14, 2003.

BACKGROUND OF INVENTION

The present invention relates in general to suspension adjusters for handlebar-steered vehicles. More particularly, the invention relates to a suspension adjustment actuator apparatus that facilitates the selective adjustment of the suspension of a handlebar-steered vehicle repeatedly between a first suspension setting and a second, user adjustable, suspension setting.

Handlebar-steered vehicles, and in particular bicycles, have increasingly relied upon hydraulic suspensions. For example, bicycles commonly feature a front suspension comprising a pair of hydraulic dampers attached to either end of the axle of the front wheel. Similar single damper configurations are used on rear suspensions. Such suspension systems have greatly enhanced the ride characteristics of bicycles and the variety of terrain that can be traversed.

Some suspension systems are adjustable. For example, the suspension can be adjusted between a firmer setting (wherein the suspension is relatively rigid) and a softer setting (wherein the suspension is permitted a predetermined amount of travel). Certain systems permit "on the fly" adjustment by a rider during operation of the bicycle. Actuators have been developed to facilitate adjustment of suspension systems during operation of a bicycle by the rider.

While such suspension systems have been developed, there have been drawbacks. For example, difficulties have been encountered with on the fly actuator systems. For example, prior art solutions often include an adjustment lever or selector that can be positioned to a plurality of discrete, predetermined factory settings. While multiple settings are permitted, it is often difficult for a rider to adjust the suspension to a desired setting on the fly; often a setting is inadvertently reached that is either too rigid or too soft. Moreover, with multiple possible settings, it becomes difficult to quickly and repeatedly switch between two particular settings, typically, a desired firm setting, and a desired soft setting. Moreover, it is often difficult or not possible to vary the desired soft setting from the available factory presets. Even when some degree of user adjustment is provided, changes using the adjustment mechanism often undesirably affect all of the settings. Thus, an adjustment to one setting disrupts another setting.

Moreover, prior art devices generally do not place the suspension actuator or control device in a position that permits comfortable, safe and fast operation by a rider with minimal effort and distraction. For example, certain solutions rely on user actuation at a location close to the suspension shock itself, remote from the customary position of a rider's hands on the handlebar. Thus, typically, a rider must remove one hand from the handlebar to operate the actuator. Other solutions include a plurality of settings that are difficult to repeatedly operate during a ride. During a treacherous portion of a ride, improper suspension adjustment may lead to loss of control and injury.

Thus, it is an object of the invention to provide a suspension actuator that can be switched between a first suspension setting and a second variable suspension setting.

It is another object of the invention to provide a suspension actuator that permits rider adjustment of the second suspension setting, a given setting permitting a precise amount of suspension travel.

These and other objects of the present invention ill become apparent in light of the specification and claims appended hereto.

SUMMARY OF INVENTION

The invention is directed to a suspension adjustment actuator apparatus for use in adjusting the suspension of a handlebar-steered vehicle. In one aspect of the invention, the apparatus comprises a body, an actuator assembly and an actuator control assembly. The body is attachable to a handlebar of the handlebar-steered vehicle. The actuator assembly includes a lever arm in pivoting engagement with the body about a pivot axis that is typically spaced apart from an axis of the handlebar. The lever arm is connected to a suspension adjustment cable. The actuator control assembly includes a locking assembly and an adjustment assembly. The locking assembly is associated with each of the body and the actuator assembly and is configured to prevent pivoting of the actuator assembly relative to the body in a first position corresponding to a first suspension setting. The adjustment assembly is likewise associated with each of the body and the actuator assembly, and is configured to prevent pivoting of the actuator assembly relative to the body in a second position corresponding to a second suspension setting. Advantageously, the second suspension setting is user adjustable through the adjustment assembly, independently of the first suspension setting.

In a preferred embodiment, the locking assembly further comprises a locking guide surface and a locking follower assembly. The locking guide surface is disposed on one of the actuator assembly and the body and includes a locking region. The locking follower assembly includes a follower pin and the follower actuator, the follower pin being capable of engagement with the locking region of the locking guide surface. The locking follower assembly is associated with the other of the actuator assembly and the body. The follower actuator includes the follower pin emanating therefrom and is capable of disengaging the follower pin from the locking region of the locking guide surface.

In another embodiment of the invention, the locking follower assembly further comprises a biasing member associated with the follower actuator. The biasing member is capable of biasing the follower pin into engagement with the locking region of the locking guide surface. Preferably, the locking guide surface is disposed on the lever arm of the actuator assembly and the locking follower assembly is associated with the body.

In another embodiment of the invention, the adjustment assembly further comprises an adjustment guide surface and an adjustment follower assembly. The adjustment guide surface is disposed on one of the body and the actuator assembly. The adjustment follower assembly is disposed on the other of the body and the actuator assembly and includes an adjustment screw and an adjustment follower. The adjustment screw includes a threadform disposed thereon. The adjustment follower includes a matingly engaging threadform disposed thereon and a pin emanating therefrom. The adjustment follower is substantially prevented from rotation relative to the other of the body and the actuator assembly, to in turn, facilitate translation of the adjustment follower relative to the adjustment screw, upon rotation of the adjustment screw.

In one such preferred embodiment, the adjustment screw further includes an adjustment wheel associated therewith, wherein rotation of the adjustment wheel imparts rotation to the adjustment screw. Preferably, the adjustment guide surface is disposed on the lever arm of the actuator assembly and the adjustment follower assembly is associated with the body.

In one embodiment, the pivot axis of the lever arm is substantially parallel with an axis of the handlebar, to in turn, facilitate the actuation of the lever arm with a thumb or other finger of a rider's hand or any other portion thereof. In another such embodiment, the lever arm further includes a cable securing assembly and an actuation tab. In one such embodiment, the cable moment arm created by the cable securing assembly and the pivot axis is smaller than the actuation moment arm created by the actuation tab and the pivot axis.

In another embodiment, the body includes an attachment assembly having a ring clamp capable of concentric position about a handlebar.

BRIEF DESCRIPTION OF DRAWINGS

The invention will now be described with reference to the drawings wherein:

FIG. 4 is an exploded perspective view of the apparatus of the present invention, showing, in particular, the components of the invention including a first side of the actuator assembly;

FIG. 4a is an enlarged view of an adjustment follower of FIG. 4; and

FIG. 5 is a perspective view of a second side of the actuator assembly.

DETAILED DESCRIPTION

Figure 1:
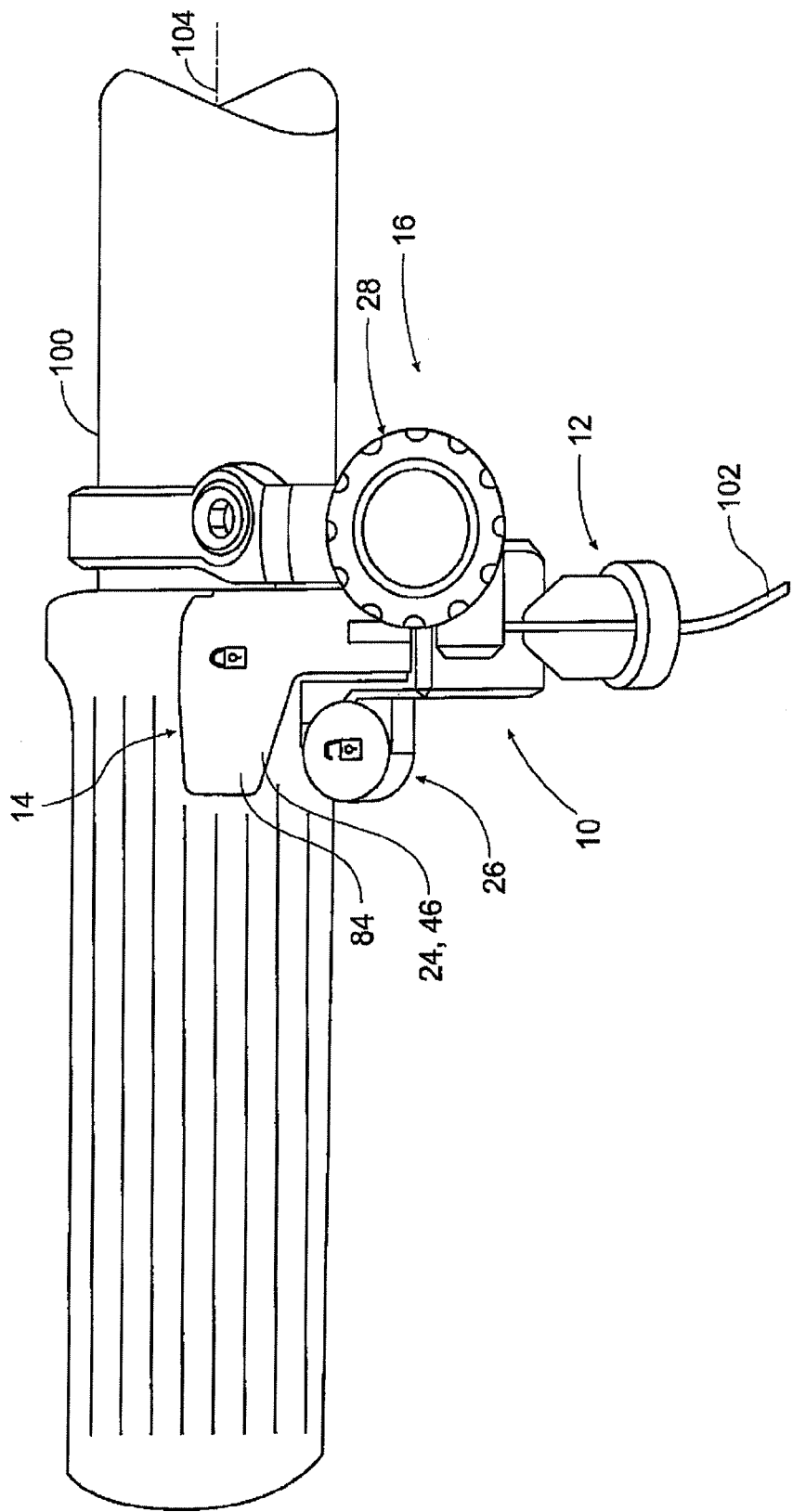
FIG. 1 is top plan view of the suspension adjustment actuator apparatus of the present invention, showing, in particular, the apparatus mounted to a handlebar.
Figures 2, 3:
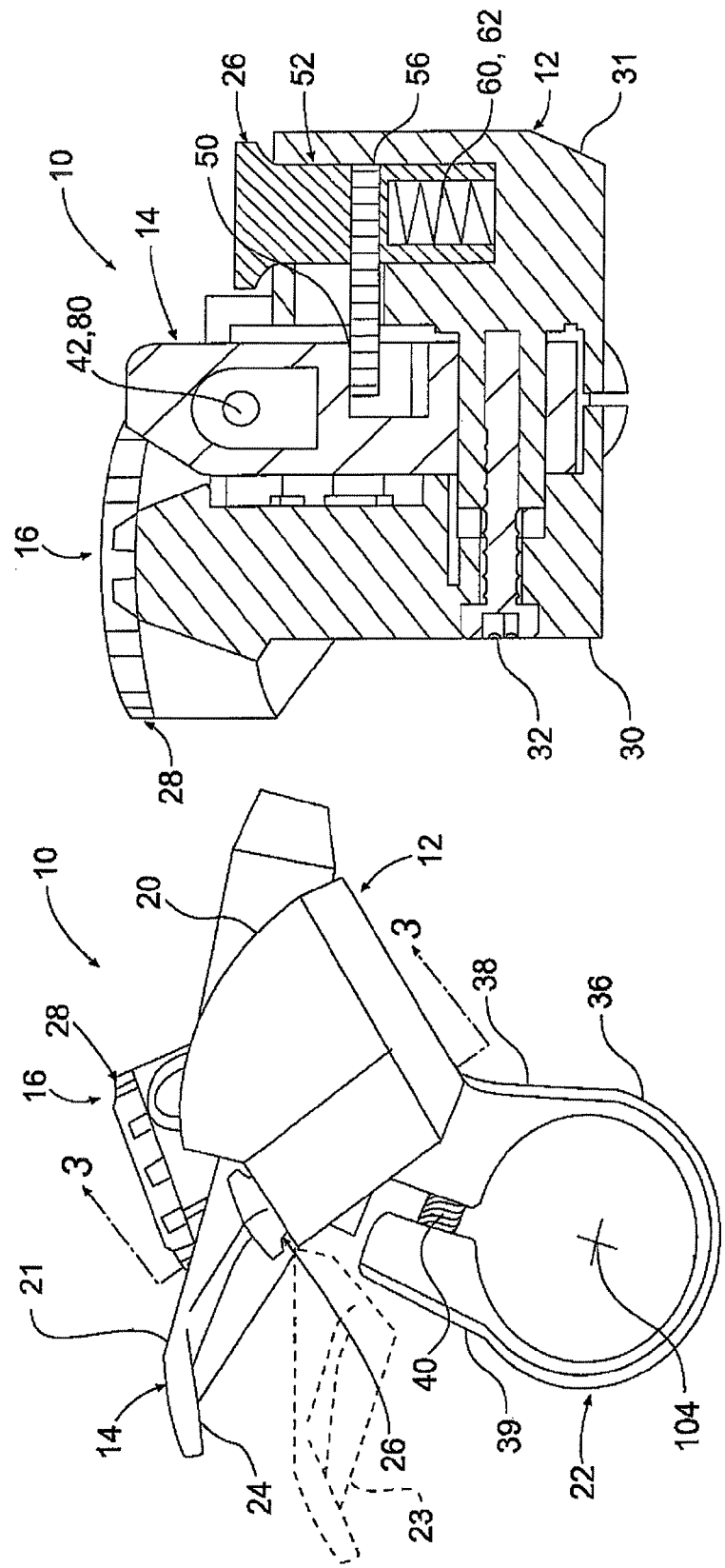
FIG. 2 is a side elevational view of the suspension adjustment actuator apparatus of the present invention.
FIG. 3 is a cross-sectional view of the apparatus of the present invention, taken generally about lines A-A of FIG.

While this invention is capable of embodiment in many different forms, there is shown in the drawings, and will be described in detail, a specific embodiment, with the understanding that the present disclosure is exemplary of the principles of the invention and is not intended to limit the invention to the illustrated embodiment.

It will be understood that like or analogous elements and/or components, referred to herein, are identified throughout the figures by like reference characters. In addition, it will be understood that the figures are merely schematic representations of a first embodiment of the invention, and that some of the components may have been distorted from their actual scale for purposes of pictorial clarity.

A suspension adjustment actuator apparatus 10 is shown in FIG. 1 comprising a body 12, an actuator assembly 14, and an actuator control assembly 16. As shown in more detail in FIG. 4, the body 12 includes a housing 20 and an attachment assembly 22. In turn, the housing 20 includes opposing housing portions 30, 31 which are joined together, for example, by fasteners 32, 34. The fastened housing portions 30, 31 collectively define a cavity 33. It will be understood that a number of different configurations are contemplated for the housing 20, and a number of different materials are contemplated, including but not limited to, metals, plastics, composites and the like.

The attachment assembly 22 comprises a ring clamp 36 and fastener 40. The ring clamp 36 shown includes a first end 38 connected to the housing portion 30 and a second end 39 that is unsupported to facilitate mounting of the actuator apparatus 10 onto the handlebar 100. While not required, in the embodiment shown, the ring clamp 36 is formed integral with the housing 20. As will be understood, the ring clamp 36 is preferably mounted coaxially onto the handlebars 100, preferably proximate a brake actuator and/or a gear shift actuator. Subsequently, a fastener 40 is tightened to secure the ring clamp 36 onto the handlebars 100. Of course, other assemblies for attaching the apparatus 10 to the handlebar are contemplated, including other releasable as well as permanent attachment assemblies. Additionally, it will be understood that the invention is not limited to a particular location or orientation of the apparatus 10 on the handlebars 100.

The actuator assembly 14 is shown in FIG. 4 as comprising a lever arm 24 which is pivotally retained or sandwiched between the housing portions 30, 31 to permit pivotal motion about a pivot axis 44. Preferably, the pivot axis 44 is substantially parallel to and spaced apart from an axis 104 defined by the handlebars 100. Of course, other oblique angles and spaced relationships between the pivot axis 44 and handlebar axis 104 are contemplated by the invention. The preferred arrangement facilitates operation by the thumb or other finger of a rider's hand, preferably without removing the rider's hand from the handlebars. Alternatively, any portion of the rider's hand may be used to operate the apparatus 10.

Lever arm 24 includes a cable securing portion 42 and preferably an actuator tab 46, including an extension 84 to facilitate actuation by any digit or portion of a rider's hand. The cable securing portion 42 is configured to retain one end of a control cable 102 (FIG. 1) which controls the operation of the suspension device (not shown). It will be understood that the control cable 102 is generally tensioned. More specifically, the cable securing portion 42 includes an eyelet 80 for retaining said one end of the control cable 102. It will be understood that the cable 102 is preferably threaded through the housing portions 30, 31 and extends through the eyelet 80. Additionally, the lever arm 24 is fitted with a channel 82 that preferably positions the cable 102 onto the lever arm 24 and serves as a guide for the cable within the cavity 33.

To provide sufficient mechanical advantage for lever operation in the embodiment shown, the moment arm $MA_1$ defined by the perpendicular distance between the cable securing assembly 42 and the pivot axis 44 is smaller than the moment arm $MA_2$ defined by the perpendicular distance between the actuator tab 46 and the pivot axis 44. With a larger actuator tab moment arm $MA_2$, the force required by the user to actuate the lever arm 24 and change the suspension setting is further reduced.

The actuator control assembly 16 is shown in FIGS. 1-5 as comprising a locking assembly 26 and an adjustment assembly 28. It will be understood that the actuator control assembly 16 is configured to facilitate rider positioning of the lever arm 24 in a first position 21 corresponding to a first suspension setting (in a preferred embodiment, a substantially rigid suspension setting with little travel), as well as facilitating rider positioning of the lever arm 24 in a second position 23 corresponding to a second suspension setting (in a preferred embodiment, a softer setting than the first suspension setting wherein the suspension is permitted a predetermined amount of travel). In the embodiment shown, downward pivotal motion of the lever arm 24 by the rider locates the lever arm in the first position 21, while upward pivotal motion of the lever arm locates the lever arm in the second position 23. Additionally, in the embodiment shown, the control cable 102 preferably biases the lever arm 24 in the second position 23.

It will further be explained that the second position of the lever arm 24, corresponding to the second suspension setting, is infinitely adjustable by the rider within the range provided, such that a rider can pre-select, and subsequently re-adjust, the second suspension setting as desired. Advantageously, the rider can then easily switch or cycle between the first and second suspension settings. Moreover, the rider can cycle between these settings with minimal movement of the rider's hand from its natural riding position on the handlebar.

More specifically, the locking assembly 26 is shown in FIG. 4 as comprising a locking guide surface 50 and a locking follower assembly 52. The locking guide surface 50 includes a travel region 53 and a locking region 54. Preferably, the locking region 54 comprises a detent or notch in the locking guide surface 50. Preferably, the locking guide surface 50 is disposed on a side of the lever arm 24. In the embodiment shown, the guide surface 50 is molded into the side of the lever arm 24.

The locking follower assembly 52 is likewise shown in FIG. 4 as comprising a follower pin 56, a follower actuator 58, and a biasing member 60. The follower pin 56 is preferably disposed on the follower actuator 58. The follower actuator 58 is positioned within a bore 86 of the housing 20 such that the follower pin 56 slidably interfaces with the locking guide surface 50. In the embodiment shown, the follower pin 56 also interfaces with the housing 20 to retain the follower actuator 58 within the bore 86. The biasing member 60 is provided within the bore 86 to bias the follower pin 56 against the guide surface 50 and into engagement with the locking position 54. Rider actuation of the biased follower actuator 58, which in the embodiment shown is in the form of a push-button, overcomes the force of the biasing member 60 to displace the follower pin 56 away from the guide surface 50 and, specifically, out of engagement with the locking position 54. In the embodiment shown, biasing member 60 comprises a coil spring 62. Of course, other biasing members and methods for biasing the follower pin 56 against the guide surface 50 are contemplated. Although in the embodiment shown, the locking guide surface 50 is disposed on the lever arm 24 and the locking follower assembly 52 is associated with the body 12, it is to be understood that in an alternative embodiment, the locking guide surface may be disposed on the body 12 while the follower assembly 52 may be associated with the lever arm 24.

The adjustment assembly 28 is shown in FIGS. 4-5 as comprising an adjustment guide surface 64 and an adjustment follower assembly 66. In the embodiment shown, the adjustment guide surface 64 is disposed on the lever arm 24. The adjustment follower assembly 66 comprises an adjustment screw 68 and an adjustment follower 70. The adjustment screw 68 includes a threadform 74 and an adjustment wheel 76 attached to a end of the adjustment screw.

The adjustment follower 70 is shown in FIG. 4 as comprising a pin 78 and a carrier 81. The carrier 81 includes a threadform 79 configured to matingly engage the threadform 74 of the adjustment screw 68 (see FIG. 4a). The adjustment follower 70 is configured to translate but not rotate, preferably within a bore 88 of body 12, while the adjustment screw is configured to rotate but not translate within the same bore 88, such that as the adjustment screw 68 is rotated, follower 70 translates along the adjustment screw, and in turn, along the bore 88. The adjustment guide surface 64 is configured to contact the pin 78 of the adjustment follower 70 when the actuator assembly 14 is in the second position. The position of the adjustment follower 70 within the bore 88 of the body 12 can be variably adjusted by the rider, by rotating the adjustment screw 68 to a desired second position of the lever arm 24, and in turn, a desired second suspension setting.

The operation of the apparatus 10 will be described with the lever arm 24 initially positioned in the first position corresponding to the first suspension setting. The follower pin 56 is biased into engagement with the locking position 54 of the locking guide surface 50 to retain the lever arm 24 in the first position. So positioned, the lever arm 24 is prevented from pivoting about pivot axis 44 and the suspension is locked in the first suspension setting wherein the suspension device is preferably substantially rigid, providing little to no suspension travel. While in this substantially rigid setting, the rider's pedaling energy is most efficiently transmitted to the pedals, with little to no rider energy being wasted in the bobbing motion of the bicycle. It will be understood that certain safety features of the suspension device, for example a bypass valve, may remain functional when the suspension is in the firm setting. In other words, the suspension may instantaneously become non rigid to absorb a large jarring impact on the suspension in the interest of rider safety, and to prevent permanent damage to the suspension device.

While riding, the rider may adjust the suspension from the first suspension setting to a softer second suspension setting, where a predetermined amount of suspension travel is permitted. To change the setting, the rider merely depresses the follower actuator in this embodiment, pushbutton 58 to disengage the follower pin 56 from the locking region 54 of the guide surface 50. Once disengaged, the tensile force of the cable 102 pivots the lever arm 24 about pivot axis 44 away from engagement of the follower pin 56 with locking region 54, and into contact of the adjustment guide surface 64 with the mating pin 78 of the adjustment follower 70, thereby placing the lever arm 24 in the second lever position. The biasing force of the cable 102 maintains the lever arm 24 in the second lever position, and in turn, the second suspension setting.

Should the rider wish to return to the first suspension setting, he merely pushes the actuator tab 46 of the lever arm 24 with any digit preferably with the thumb—or any portion of his hand, to pivot the lever arm 24 in the opposite direction until the follower pin 56 is once again firmly engaged in the locking position 54. As the lever arm 24 pivots about axis 44, the follower pin 56 travels along the travel region 53 of the locking guide surface 50 until reaching the locking region 54. At such time, biasing member 60 biases the follower actuator 58, and in turn, the follower pin 56, into engagement with the locking region 54. The lever arm 24, now securely locked in the first position, is prevented from further pivoting to maintain the first suspension setting. Advantageously, this suspension change can be accomplished quickly, with little rider effort, without moving the rider's hand from the handlebar, and without diverting the rider's attention from the terrain in front of him. As a further advantage, the rider is able to adjust the second suspension setting to any desired setting. In particular, by rotating the adjustment screw 68 to translate the pin 78 of the adjustment follower 70 along the adjustment screw such that the pin 78 contacts the adjustment guide surface 64 in a new location, thereby bringing the lever arm 24 to rest in a different second position corresponding a new second suspension setting. By reversably rotating the adjustment wheel 76, the rider may selectively adjust the desired second position of the lever arm 24 and in turn, the second suspension setting. The farther from the first position that the rider locates the second position of the lever arm 24, the softer the suspension setting. The rider may rotate the adjustment wheel 76 to the desired second suspension setting while the lever arm 24 is in the first position, or alternatively, while the lever arm is in the second position.

While this invention has been described by reference to a preferred embodiment, it should be understood that numerous changes could be made within the spirit and scope of the inventive concepts described. Accordingly, it is intended that the invention not be limited to the disclosed embodiment, but that it have the full scope permitted by the language of the following claims.

The invention claimed is:

1. A suspension adjustment actuator apparatus for use in adjusting the suspension of a handlebar-steered vehicle, the apparatus comprising:
   a body attachable to a handlebar of the handlebar-steered vehicle;
   an actuator assembly including a lever arm in pivoting engagement with the body about a pivot axis spaced apart from an axis of the handlebar, the lever arm associated with a suspension adjust cable; and
   an actuator control assembly, the actuator control assembly including:
      a locking assembly associated with each of the body and the actuator assembly, the locking assembly preventing pivoting of the actuator assembly relative to the body in a first locked position corresponding to a first suspension setting; and
      an adjustment assembly including an adjustment screw, the adjustment assembly associated with each of the body and the actuator assembly, the adjustment assembly repeatably retaining the actuator assembly relative to the body in a second end position corresponding to a second suspension setting, wherein the second suspension setting is adjustable within a range of alternative second suspension settings through adjustment of the adjustment screw to pre-select one of the second end positions independently of the first suspension setting, the actuator assembly repeatably switchable between the first locked position and the pre-selected one of the second end positions, the second end positions defining rest positions.

2. The apparatus of claim 1 wherein the first suspension setting is substantially rigid.

3. The apparatus of claim 1 wherein the locking assembly further comprises:
   a locking guide surface having a locking region;
   a locking follower assembly including:
      a follower pin configured to travel along the locking guide surface and capable of engagement with the locking region of the locking guide surface; and
      a follower actuator configured to release the follower pin from the locking region of the locking guide surface, the locking guide surface disposed on one of the actuator assembly and the body, the locking follower assembly is associated with the other of the actuator assembly and the body.

4. The apparatus of claim 3 wherein the locking follower assembly further comprises a biasing member associated with the follower actuator, the biasing member biasing the follower pin into engagement with the locking region of the locking guide surface.

5. The apparatus of claim 3 wherein the locking guide surface is disposed on the lever arm of the actuator assembly and the locking follower assembly is associated with the body.

6. The apparatus of claim 5 wherein the first suspension setting is substantially rigid.

7. The apparatus of claim 1 wherein the adjustment assembly further comprises:
   an adjustment guide surface disposed on one of the body and the actuator assembly;
   an adjustment follower assembly associated with the other of the body and the actuator assembly, the adjustment follower assembly including:
      a threadform disposed on the adjustment screw, the adjustment screw being translationally fixed and rotatable relative to the other of the body and the actuator assembly; and
      an adjustment follower having a threadform disposed thereon matingly engaged with the threadform disposed on the adjustment screw and a pin emanating therefrom, wherein the adjustment follower is substantially prevented from rotation relative to the other of the body and the actuator assembly, to in turn, facilitate translation of the adjustment follower relative to the adjustment screw upon rotation of the adjustment screw, the pin on the adjustment follower configured to engage the adjustment guide surface to position the actuator assembly relative to the body in the second end position.

8. The apparatus of claim 7 wherein the adjustment screw further includes an adjustment wheel associated therewith, wherein rotation of the adjustment wheel imparts rotation to the adjustment screw.

9. The apparatus of claim 7 wherein the adjustment guide surface is disposed on the lever arm of the actuator assembly and the adjustment follower assembly is associated with the body.

10. The apparatus of claim 9 wherein the first suspension setting is substantially rigid.

11. The apparatus of claim 1 wherein the pivot axis of the lever arm is substantially parallel with an axis of the handlebar, to in turn, facilitate the actuation of the lever arm with one of a digit and a hand of a user.

12. The apparatus of claim 11 wherein the lever arm further includes:
   a cable securing assembly; and
   an actuation tab.

13. The apparatus of claim 12 wherein a cable moment arm created by the cable securing assembly and the pivot axis is smaller than an actuation moment arm created by the actuation tab and the pivot axis.

14. The apparatus of claim 13 wherein the first suspension setting is substantially rigid.

15. The apparatus of claim 1 wherein the body further comprises an attachment assembly including a ring clamp capable of substantially concentric position about the handlebar.

16. A suspension adjustment actuator apparatus for use in adjusting a suspension of a handlebar-steered vehicle, the apparatus comprising:
   a body attachable to a handlebar of the handlebar steered vehicle;
   an actuator assembly including a lever arm in pivoting engagement with the body about a pivot axis, the lever arm associated with a suspension adjust cable, the actuator assembly having a first locked position corresponding to a first suspension setting and a second end position corresponding to a second suspension setting; and
   an actuator control assembly including an adjustment assembly including an adjustment screw, the adjustment assembly associated with each of the body and the actuator assembly, the adjustment assembly repeatable retaining the actuator assembly relative to the body in the second end position corresponding to the second suspension setting, wherein the second end position and corresponding second suspension setting are adjustable within a range of alternative second end positions and corresponding second suspension settings through adjustment of the adjustment screw of the adjustment assembly to pre-select one of the alternative second end positions, independently of the first suspension setting, the actuator control assembly facilitating the repeated switching of the actuator assembly directly between the first locked position and any one of the alternative second end positions and corresponding second suspension settings, the actuator assembly repeatably switchable between the first locked position and the pre-selected one of the second end positions, the second end positions defining rest positions.

17. The apparatus of claim 16 wherein the actuator control assembly further includes a locking assembly configured to prevent movement of the lever arm of the actuator assembly relative to the body in the first locked position.

18. The apparatus of claim 17 wherein the locking assembly includes a push-button associated with the body, the push-button operable to release the lever arm from the first locked position.

19. The apparatus of claim 18 wherein the locking assembly further comprises:
 a locking guide surface having a locking region; and
 a locking follower assembly including the push-button with a follower pin disposed thereon, the follower pin configured to be releasably positionable within the locking region of the locking guide surface.

20. The apparatus of claim 19 wherein the locking follower assembly further comprises a biasing member associated with the push-button, the biasing member biasing the follower pin into engagement with the locking region of the locking guide surface.

21. The apparatus of claim 20 wherein the first suspension setting is substantially rigid.

22. The apparatus of claim 16 wherein the adjustment assembly comprises an adjustment guide surface and a translationally adjustable mating pin configured to engage the adjustment guide surface.

23. The apparatus of claim 22 wherein
 the adjustment screw is translationally fixed and rotatable relative to the body and has a threadform disposed thereon; and
 further comprising an adjustment follower having a threadform disposed thereon matingly engaged with the threadform disposed on the adjustment screw, the mating pin disposed on the adjustment follower, the adjustment follower being rotatively fixed relative to the body, whereby rotation of the adjustment screw translates the adjustment follower, and in turn the mating pin, along the adjustment screw.

24. The apparatus of claim 23 wherein the first suspension setting is substantially rigid.

25. The apparatus of claim 16 wherein the pivot axis of the lever arm is substantially parallel to and spaced apart from an axis of the handlebar.

* * * * *